J. MERLETTE. Jr.
Egg and Fruit Carrier.

No. 221,589. Patented Nov. 11, 1879.

3 Sheets—Sheet 2.

J. MERLETTE. Jr.
Egg and Fruit Carrier.

No. 221,589. Patented Nov. 11, 1879.

Witnesses:
W. E. McC...
John L. Rogers

Inventor,
John Merlette Jr.
Per T. H. Alexander Elliott
Attorneys.

N. PETERS, PHOTO-LITHOGRAPHER, WASHINGTON, D. C.

3 Sheets—Sheet 3.

J. MERLETTE, Jr.
Egg and Fruit Carrier.

No. 221,589. Patented Nov. 11, 1879.

Witnesses:
W. C. McArthur
John C. Rogers

Inventor:
John Merlette Jr.
per
T. R. Alexander & Elliott
Attorneys.

UNITED STATES PATENT OFFICE.

JOHN MERLETTE, JR., OF BOUNDBROOK, NEW JERSEY, ASSIGNOR OF ONE-HALF OF HIS RIGHT TO BENJAMIN B. MATTHEWS, OF SAME PLACE.

IMPROVEMENT IN EGG AND FRUIT CARRIERS.

Specification forming part of Letters Patent No. 221,589, dated November 11, 1879; application filed October 3, 1879.

*To all whom it may concern:*

Be it known that I, JOHN MERLETTE, Jr., of Boundbrook, in the State of New Jersey, have invented certain new and useful Improvements in Egg and Fruit Carriers; and I do hereby declare that the following is a full, clear, and exact description thereof, reference being had to the accompanying drawings, and to the letters of reference marked thereon, which form part of this specification, in which—

Figure 1:
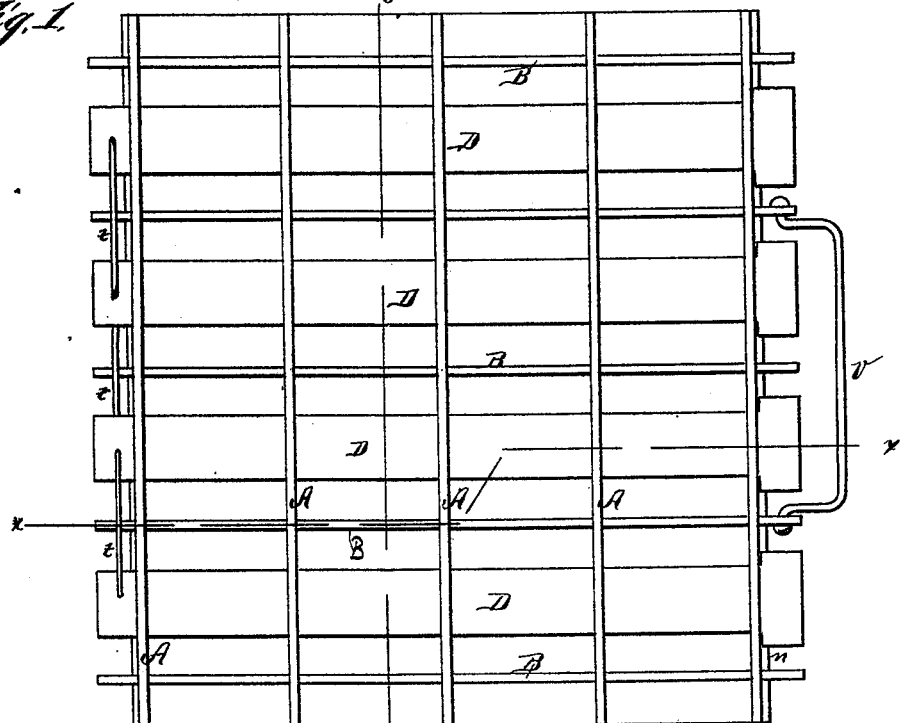
Figure 2:
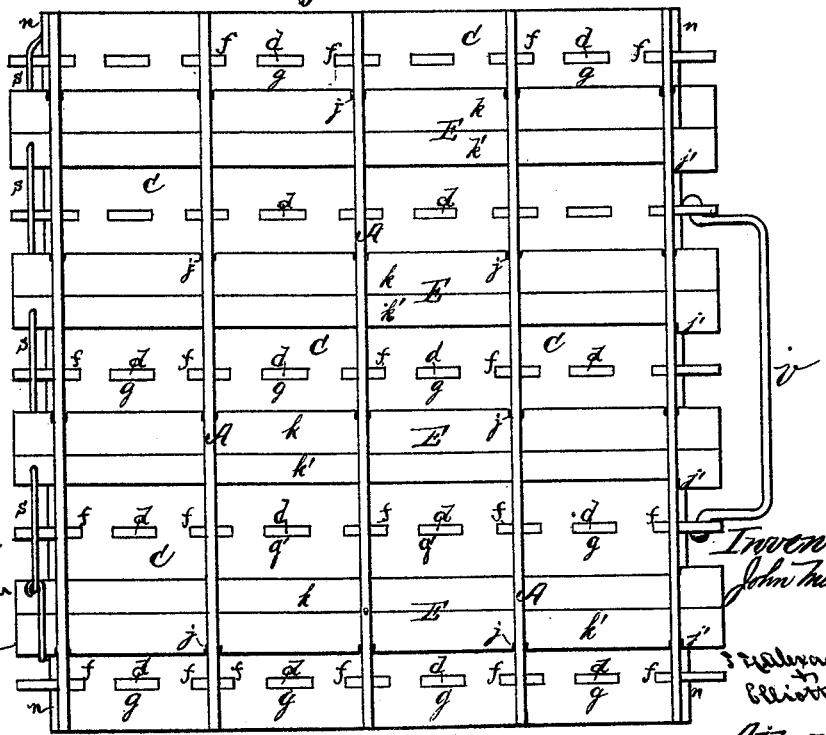
Figure 3:
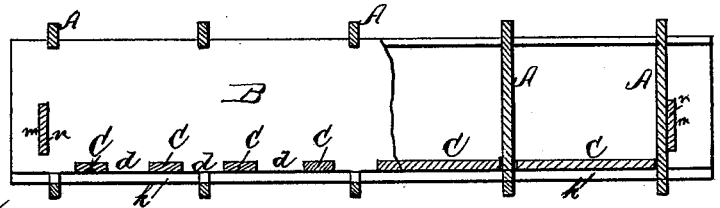
Figure 4:
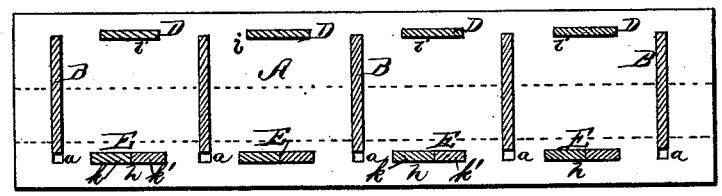
Figure 10:
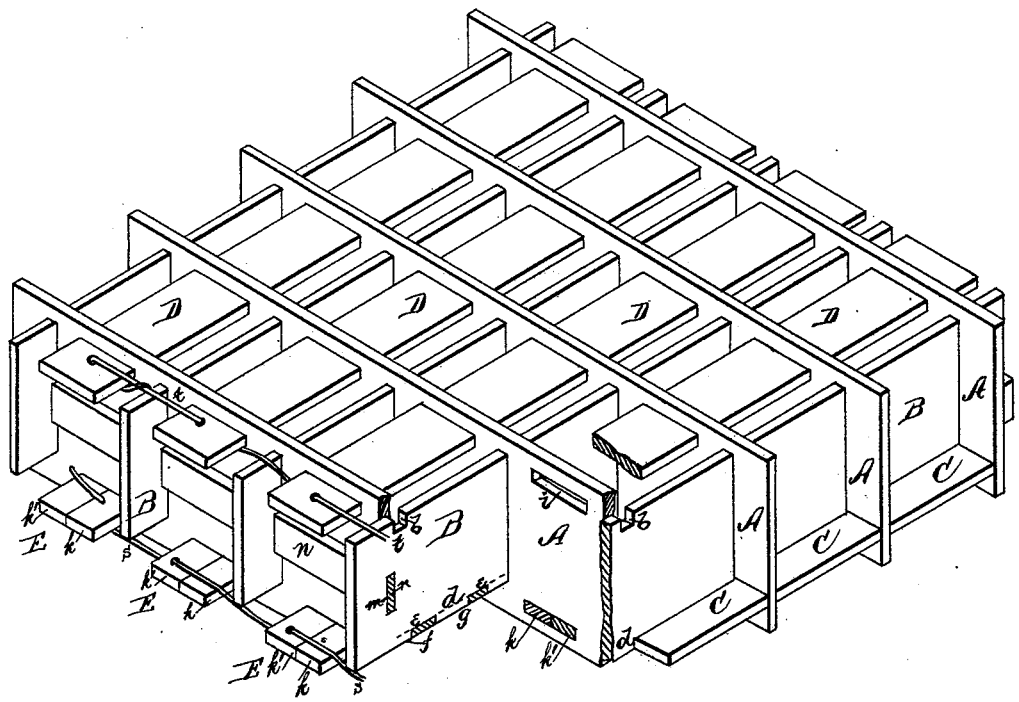
Figure 11:
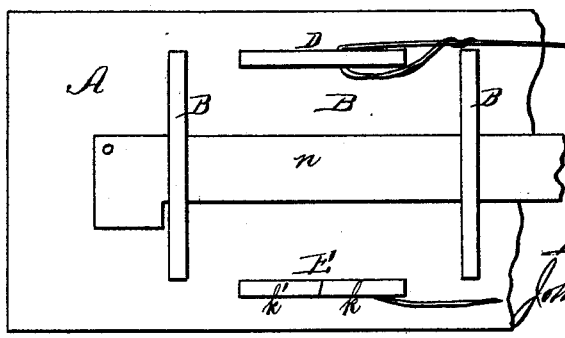

Figure 1 is a plan view; Fig. 2, a bottom view; Fig. 3, a section on line $x\,x$, Fig. 1; Fig. 4, a section on line $y\,y$, Fig. 1; and Figs. 5, 6, 7, 8, and 9 are detailed views of the separate pieces of my carrier. Fig. 10 is a perspective view, partly in section; and Fig. 11, a broken-end view, enlarged.

The object of my invention is to provide a safe, simple, and inexpensive carrier for eggs, fruit, or such other articles as require great care in their transportation, the nature of which will be more specifically set forth in the claims.

In order to enable others skilled in the art to which my invention pertains to make and use the same, I will now proceed to describe its construction.

My carrier is constructed of several slats of different forms, and each form is duplicated a sufficient number of times to form a case of any given dimensions, or with any desired number of cells.

In the drawings, A represents one of the division-slats, of any suitable material, having vertical slots $a\,a$ extending nearly across it, and horizontal slots $i\,i$ and $h\,h$, as seen in Fig. 4.

Figure 7:
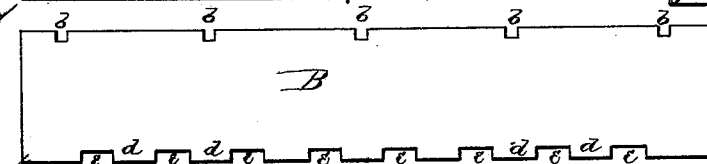

In Fig. 7, B represents one of the cross-slats, whose upper edge is notched at regular intervals, as indicated at $b$, and whose under edge is provided with a series of right-angular notches, $e$, forming tongues $d$ between them. These slats are also provided near their ends with a short transverse slot, $m$.

Figure 8:
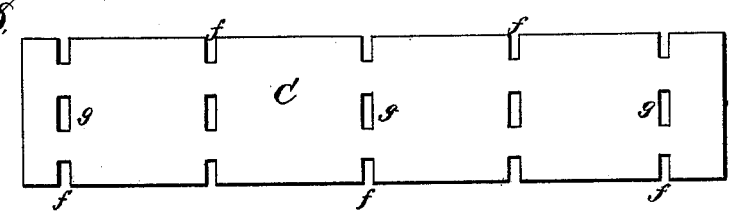
Figure 9:

In Fig. 8, C is one of the bottom slats, having in each edge, at regular intervals, a series of small notches, $f\,f$, and in the center a series of corresponding slots, $g\,g$, for the reception of tongues $d\,d$ when the parts are rightly placed to form the carrier.

Figure 5:
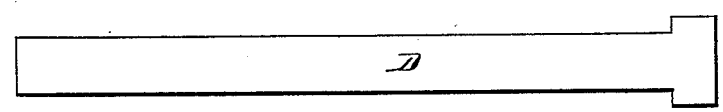
Figure 6:
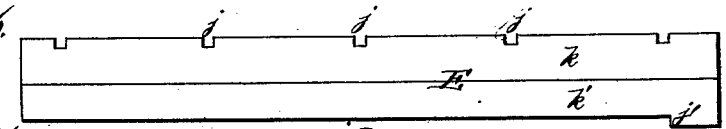

In Fig. 5, D is a representation of one of the sliding top slats, having a T head at one end. This slat passes through slots $i\,i$ in slat A, as seen in Figs. 1 and 4.

E represents one of the key-slats, (seen in Fig. 6,) which are composed of pieces $k\,k'$. The piece $k$ is upon one side provided with a series of notches, $j$, and the piece $k'$ is provided at one end with a shoulder, $j'$.

To put this carrier together, I set up the division-slats A and pass the cross-slats B through the vertical slots $a\,a$ till the slots and notches $b\,b$ correspond. Then, by pushing the cross-slats upward, they will interlap with the slats A, and the two be held firmly in position. Now place the bottom pieces C lengthwise between the division-slats A A, so their notches $f$ and slots $g$ will correspond with the notches $e$ and tongues $d$ on the lower edges of the cross-slats B, and by pushing the bottoms upward the slots will slip over the tongues $d$ and aid in holding the case together. To fasten these bottoms and prevent their falling out of place, I slip the piece $k$ through the slots $h\,h$ in the division-slats A A until its notches $j$ come opposite those in the division-slats, when the piece $k'$ may be inserted, which will force the notches $j\,j$ to interlap with those $h\,h$, as seen in Fig. 2, holding the slats A B C locked firmly together.

In carrying eggs and fruit it is sometimes necessary to confine them to prevent their being thrown out of the tops of the cells, and I accomplish this by passing a T-headed slat, D, through the slots $i\,i$ in the division-boards A, and secure their ends by a wire or cord, $t$, as seen in Fig. 1. The ends of the key-slats $k'$ are also secured by a wire, as seen at $s$, Fig. 2.

To prevent the outer division-boards, A, from slipping off the ends of the cross-slats B, I also pass a plain strip, $n$, through the slots $m$, as seen in Figs. 1, 2, 3, and secure them by a screw or nail, or by the ends of the wires $s$ and $t$.

In order that the cases may be conveniently handled, I attach one or more handles, r, of wire, rope, or any suitable material.

It is obvious that this carrier may be constructed to fit a packing-case of any desired shape or form, and may be used for carrying anything necessary to be separated to prevent damage. For instance, it may be used for a shipping-case for bottles by removing the slat D, having the T head, and the bottoms C and key E.

Having thus fully described my invention, what I claim as new, and desire to secure by Letters Patent, is—

1. The combination of the division-slats A A, cross-slats B B, and bottom slats C C, each part being constructed and arranged in relation to each other, substantially as and for the purpose set forth.

2. The combination, in an egg and fruit carrier, of slats A B C with key-slats $k$ $k'$, all being constructed and arranged substantially as herein described.

3. The combination, with slats A B C and key-slats $k$ $k'$, of sliding top slats, D D, all constructed and arranged to form an egg or fruit carrier, substantially as herein shown.

4. In an egg and fruit carrier, the combination of slats A B C D with binding-slats $n$ $n$, all constructed and arranged substantially as and for the purpose set forth.

In testimony that I claim the foregoing as my own I affix my signature in presence of two witnesses.

JOHN MERLETTE, JR.

Witnesses:
T. W. FRECH,
CHARLES VAN AULEN.